United States Patent
Brassard et al.

(10) Patent No.: US 9,623,887 B1
(45) Date of Patent: Apr. 18, 2017

(54) UTILITY CART

(71) Applicants: Dustin S. Brassard, Woburn, MA (US); Amy Button, Woburn, MA (US)

(72) Inventors: Dustin S. Brassard, Woburn, MA (US); Amy Button, Woburn, MA (US)

(*) Notice: Subject to any disclaimer, the term of this patent is extended or adjusted under 35 U.S.C. 154(b) by 0 days.

(21) Appl. No.: 14/826,698

(22) Filed: Aug. 14, 2015

Related U.S. Application Data

(60) Provisional application No. 62/037,350, filed on Aug. 14, 2014.

(51) Int. Cl.
| | | |
|---|---|---|
| *B62B 3/00* | (2006.01) | |
| *B62B 5/00* | (2006.01) | |
| *B62B 5/06* | (2006.01) | |

(52) U.S. Cl.
CPC ............ *B62B 3/004* (2013.01); *B62B 5/0006* (2013.01); *B62B 5/06* (2013.01)

(58) Field of Classification Search
CPC . A47B 31/00; B25H 1/04; B25H 1/12; B25H 3/00; B25H 3/02; B25H 3/004; B25H 3/005; B62B 1/10; B62B 1/12; B62B 1/26

See application file for complete search history.

(56) References Cited

U.S. PATENT DOCUMENTS

| | | | |
|---|---|---|---|
| 2,113,995 | A | 4/1938 | Salvage |
| 2,190,498 | A | 2/1940 | Williams |
| D212,088 | S | 8/1968 | Salsgiver |
| 5,314,243 | A | 5/1994 | McDonald et al. |
| 5,704,496 | A * | 1/1998 | Latta .................. B25H 3/04 211/70.6 |
| D517,768 | S | 3/2006 | Arceta |
| 8,210,548 | B1 | 7/2012 | Agyemang |
| 8,286,977 | B2 | 10/2012 | Butler et al. |
| 8,348,301 | B2 | 1/2013 | Darling, III |
| 8,424,883 | B1 | 4/2013 | Ramos |
| 2003/0201697 | A1 | 10/2003 | Richardson |
| 2004/0227315 | A1* | 11/2004 | Van Landingham, Jr. ................ A47B 31/00 280/47.35 |

FOREIGN PATENT DOCUMENTS

| | | |
|---|---|---|
| CA | 2228026 A1 | 7/1998 |
| CN | 203075110 U | 7/2013 |
| CN | 203138991 U | 8/2013 |

* cited by examiner

*Primary Examiner* — Bryan Evans
(74) *Attorney, Agent, or Firm* — Robert C. Montgomery; Montgomery Patent Design, LP.

(57) ABSTRACT

A utility cart, preferably adapted for medical or food purposes, is provided with a shelf section and a cabinet section. Each section is adapted to store supplies, such as gloves and aprons, utilized in this endeavor. Each section is further adapted to provide a means to dispose of refuse and discharged equipment and supplies. The cart is preferably provided with a wheel assembly for ease of transport.

16 Claims, 7 Drawing Sheets

UTILITY CART

RELATED APPLICATIONS

The present invention is a continuation of, was first described in, and claims the benefit of U.S. Provisional Application No. 62/037,350, filed Aug. 14, 2014, the entire disclosures of which are incorporated herein by reference.

FIELD OF THE INVENTION

The present invention relates generally to a utility cart, and in particular a cart for carting a plurality of cleaning or medical supplies in bulk or individually.

BACKGROUND OF THE INVENTION

The push cart finds frequent use as a transportation aid at businesses and work locations for supplies and materials. Its low center of gravity coupled with its high payload capacity makes it ideal for transporting items from vehicles, trucks, work cribs, store rooms, supply cabinets, and the like. However, such transportation duties means transferring items to the cart from one (1) storage location, and then from the cart to another storage location in a separate work action. Also, depending on the material or supplies on the cart, they may be valuable and subject to theft while on the unsecured cart. Additionally, many items such as disposable gloves and aprons may be dispensed directly from the cart, but the unsecured boxes make it difficult to dispense, particularly when using only one (1) hand, as the entire box lifts up when one (1) item is removed. Accordingly, there exists a need for a means by which a various supplies and materials can be stored, transported, and dispensed without the disadvantages as described above. The development of the present invention fulfills this need.

SUMMARY OF THE INVENTION

It is therefore an object of the present invention to provide a utility cart, capable of being manipulated and transported by a user, the cart having a bottom, generally rectangular cabinet with a plurality of wheel assemblies having a storage cavity therein, and a securable door assembly providing access to the storage cavity. In different embodiments, the door assembly could include one (1) or two (2) doors. In different embodiments, a plurality of bumpers may be provided, each located at a corner of the cabinet. In different embodiments, at least one (1) interior shelf may be supported within the cavity. A top shelf is located on the upper perimeter of the cabinet and has a perimeter guide rail. A push handle extends away from a first side of the cabinet and sharing the same geometrical plane as the guide rail. At least one (1) container holder is attached to an upper surface of the top shelf.

In at least one (1) embodiment, each wheel assembly is an axle and hub having wheels rotatingly affixed to distal ends thereof. In this embodiment, at least two (2) wheel assemblies are drivable and at least two (2) wheel assemblies are fixed.

In another embodiment, the push handle is provided with a tray having a plurality of recessed molds, each recess mold may be configured to slidably receive and retain ancillary items therein.

In another embodiment, a container lid is provided for each individual container holder. Each container lid is configured to fit within a respective container holder and hold ancillary items placed therein. Some embodiments of the container lids may provide a breach portion, thereby enabling retrieval of the ancillary items.

In yet another embodiment, at least one (1) receptacle, each having at least one (1) hook, is configured to be supported on the guide rail.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
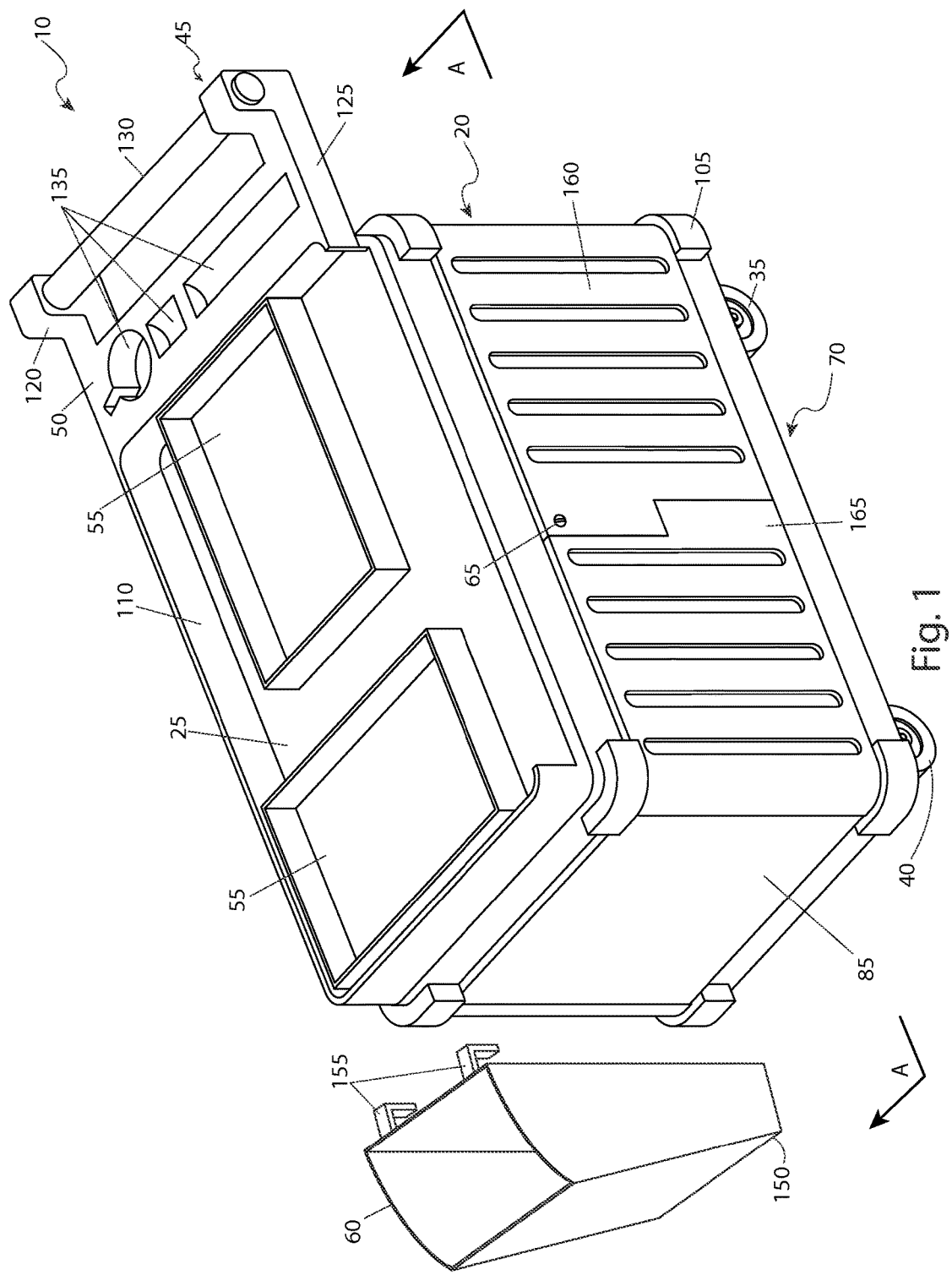
FIG. 1 is a perspective view of a utility cart 10 in accordance with the preferred embodiment of the present invention.
Figure 2:
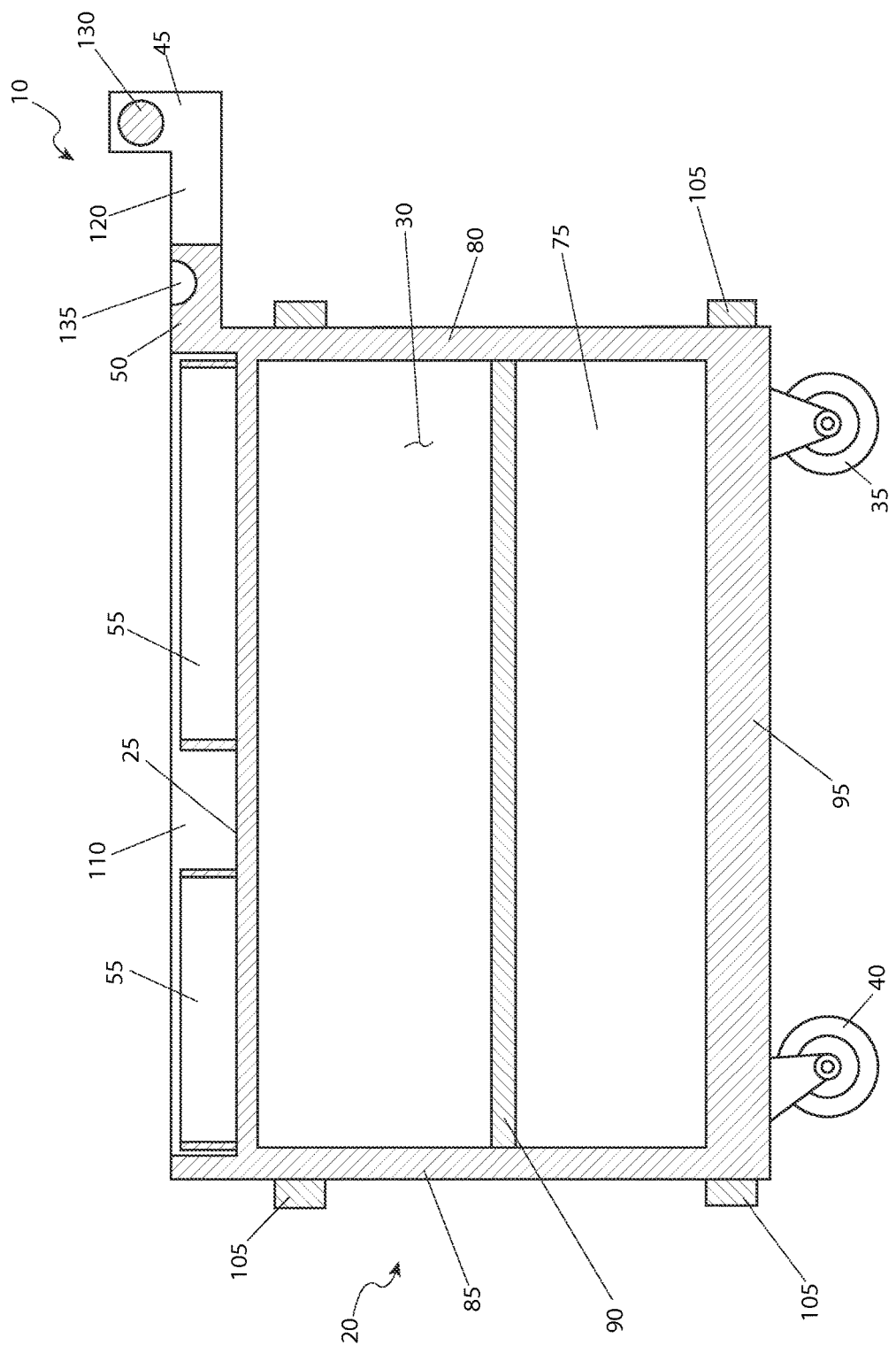
FIG. 2 is a section view along a line A-A as shown on FIG. 1 of the utility cart 10 in accordance with the preferred embodiment of the present invention.
Figure 3:
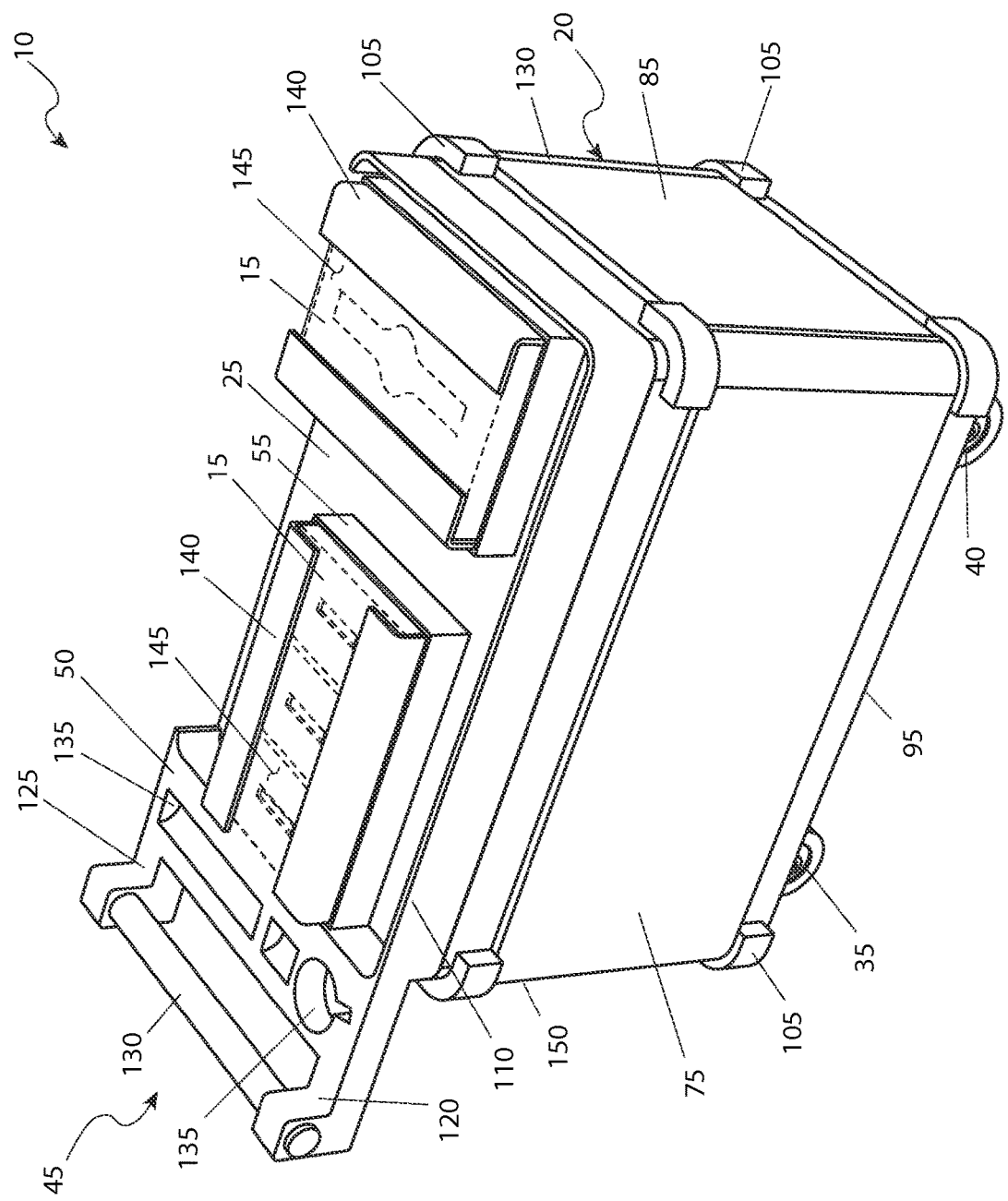
FIG. 3 is another perspective view of the utility cart 10 with exemplary commodities 15 loaded into holders 55 in accordance with the preferred embodiment of the present invention.
Figure 4:
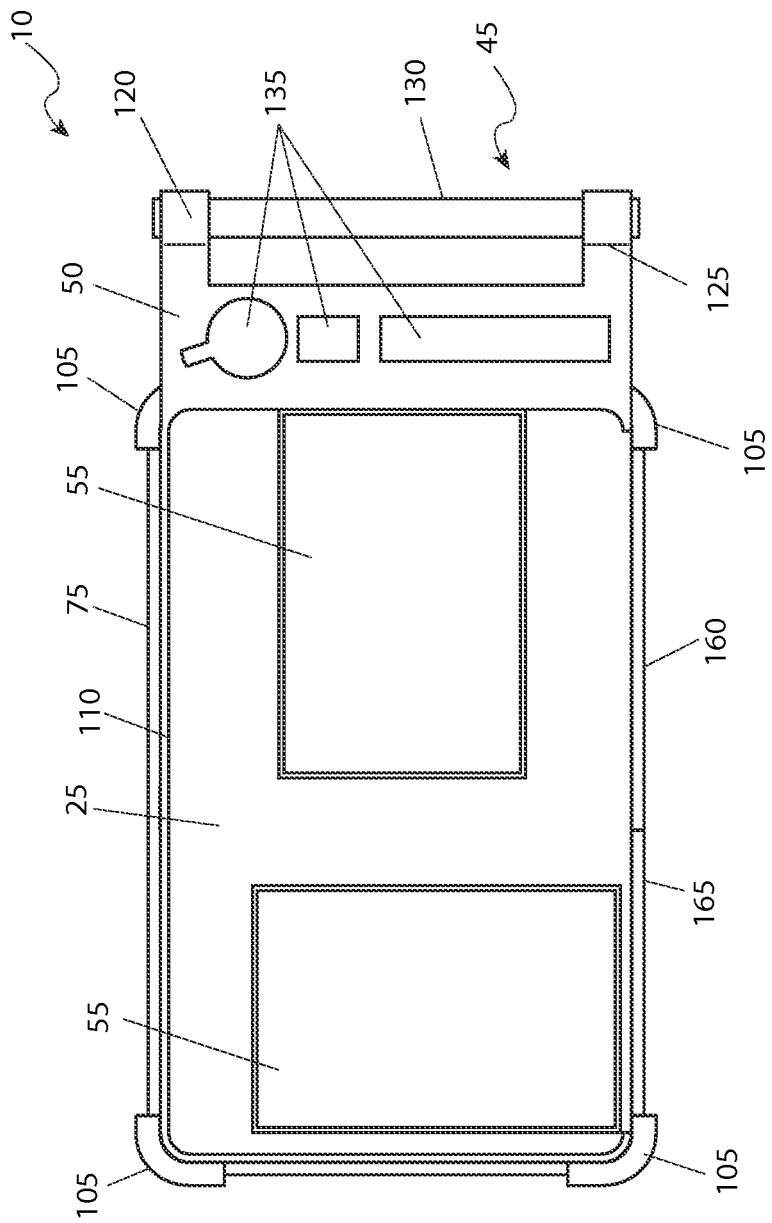
FIG. 4 is a top plan view of the utility cart 10 in accordance with the preferred embodiment of the present invention.
Figure 5:
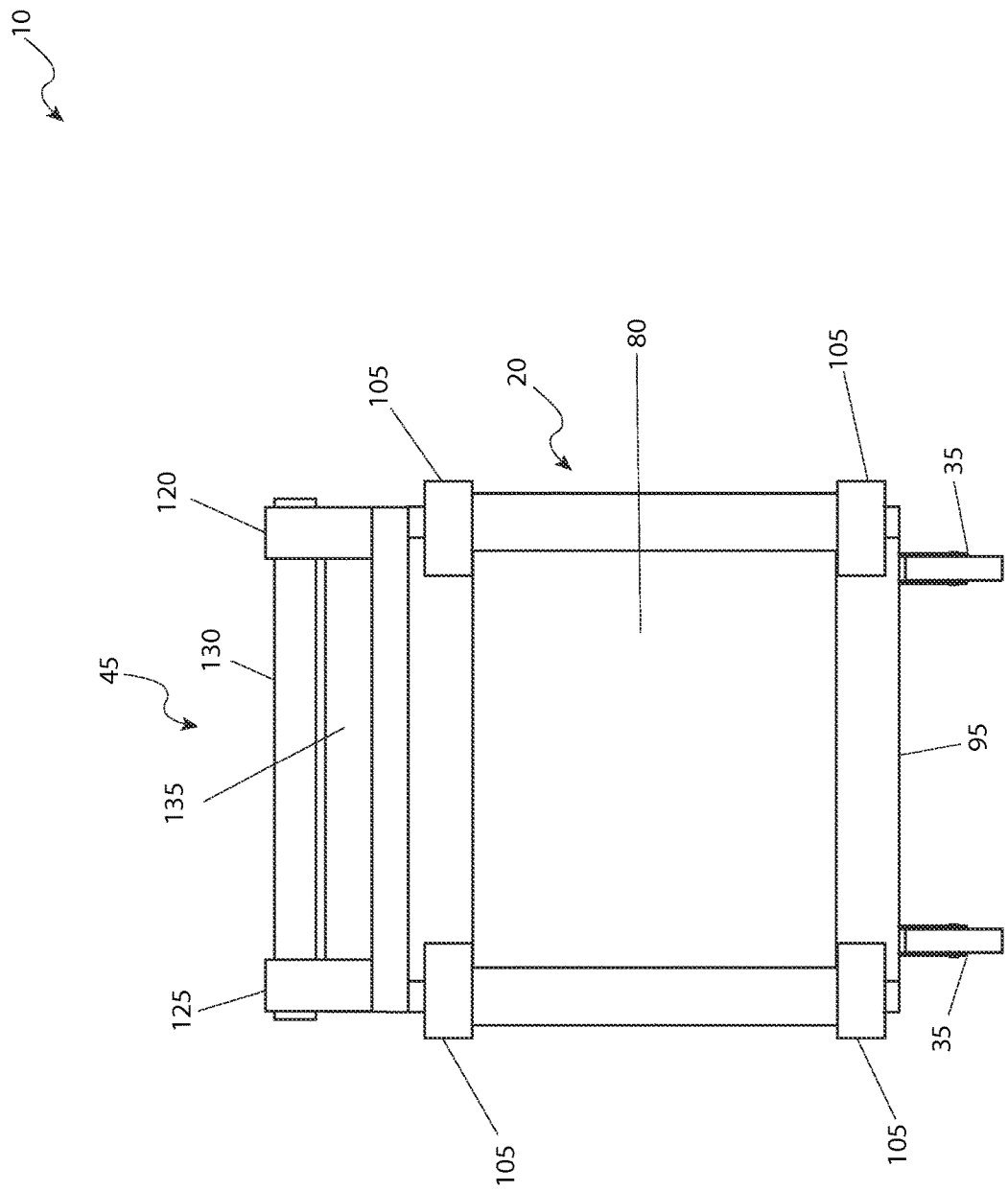
FIG. 5 is a side view of a front of the utility cart 10 in accordance with the preferred embodiment of the present invention.
Figure 6:
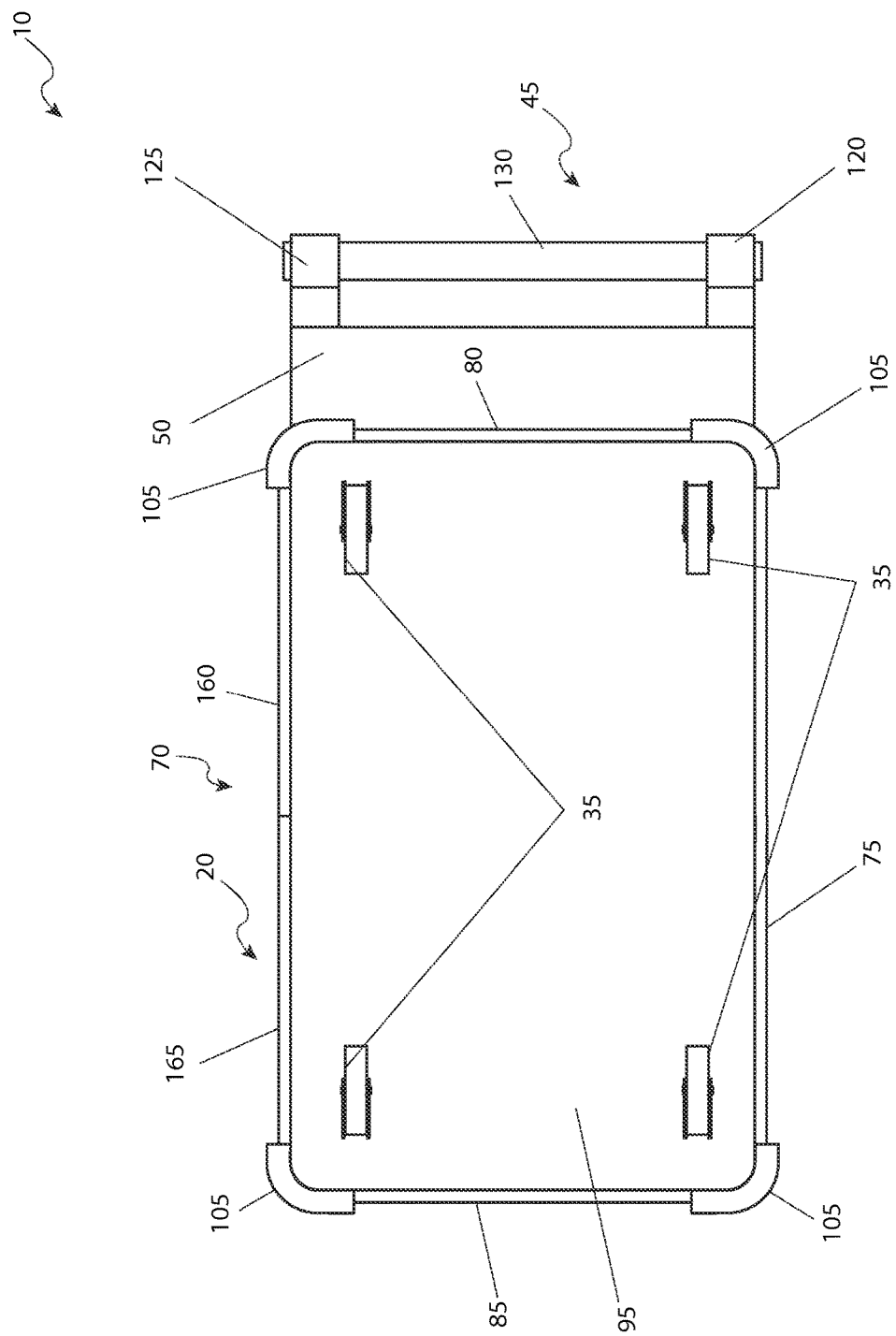
FIG. 6 is a perspective view of the utility cart 10 in accordance with the preferred embodiment of the present invention; and, FIG. 7 is a perspective view of a utility cart 10 in accordance with an alternate embodiment of the present invention.

DESCRIPTIVE KEY 10 utility cart
15 commodities
20 cabinet
25 top shelf
30 storage cavity
35 fixed wheel
40 steerable wheel
45 handle
50 tray
55 holder
60 receptacle
65 locking mechanism
70 first side
75 second side
80 rear
85 front
90 interior shelf
95 bottom
105 bumper
110 rail
120 first arm
125 second arm
130 grab bar
135 recess
140 container lid
145 breach
150 receptacle bottom
155 hook 160 first door
165 second door

DETAILED DESCRIPTION OF THE PREFERRED EMBODIMENT

Figure 7:
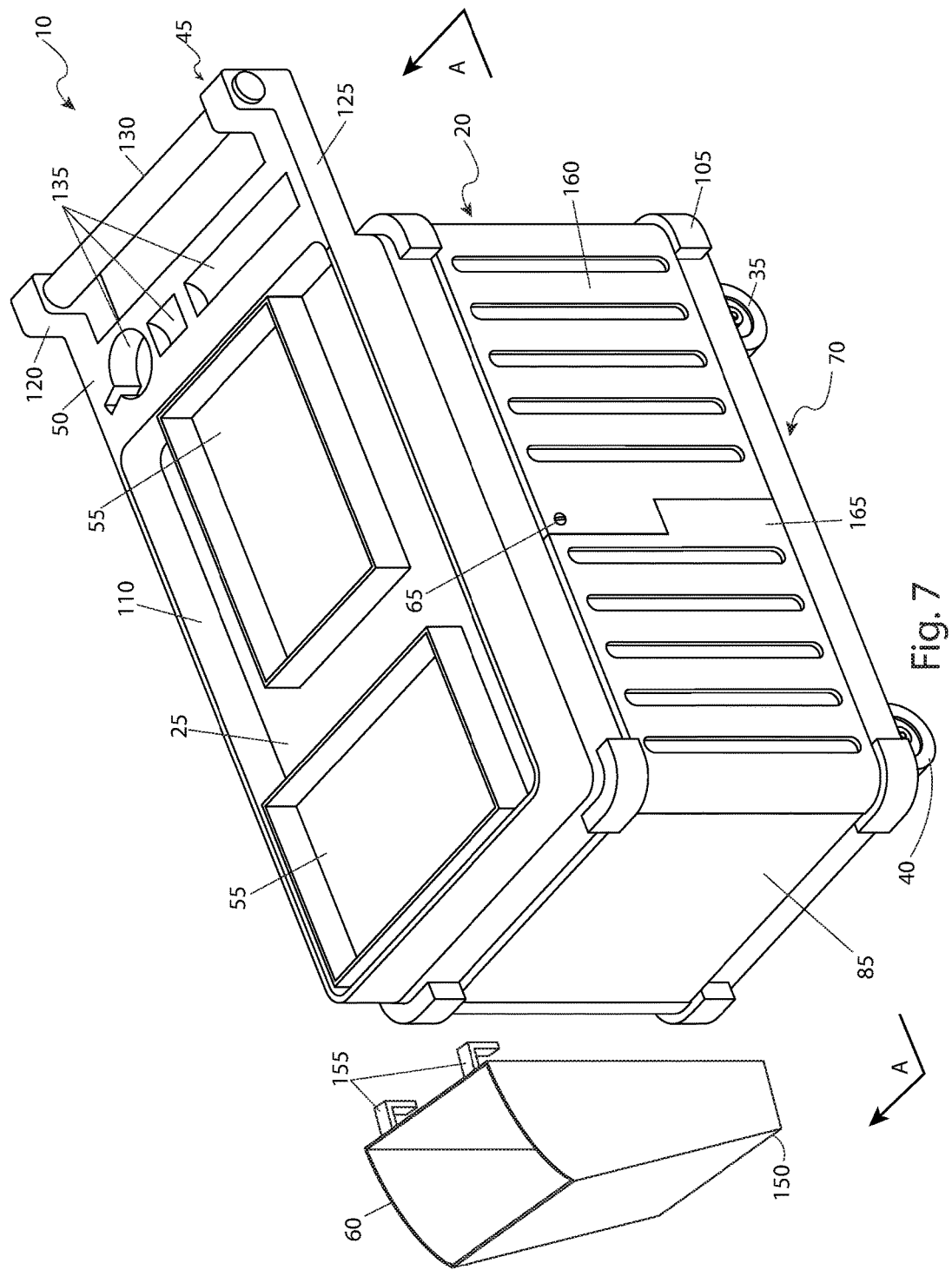

The best mode for carrying out the invention is presented in terms of its preferred embodiment, herein depicted within FIGS. 1 through 6 and alternately in FIG. 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a cabinet 20 having a top shelf 25 and at least one (1) door 160, 165 (herein referred to as the "device") 10, which is specifically adapted with a handle 45, holders 55, and receptacles 60 to store, transport, and dispense various commodities 15 individually or in bulk.

Referring now to FIGS. 1 through 6, various views of the utility cart 10, in accordance with the preferred embodiment of the present invention, are disclosed. The cabinet 20 is envisioned to be a rectangular polyhedron having the approximate dimensions of thirty-six inches (36 in.) in height, eighteen inches (18 in.) in width, and thirty inches (30 in.) in length; however, the invention is not limited to such dimensions. The cabinet 20 is further provided with a top shelf 25, an interior storage cavity 30 accessed by at least one (1) door 160, 165, a plurality of wheel assemblies 35, 40 for transport, and a handle 45. Other features include a tray 50, at least one (1) holder 55, and at least one (1) receptacle 60 to be used for provisions storage or refuse. In addition, the doors 160, 165 are capable of being locked in a closed position via a locking mechanism 65. The configuration of the device 10, along with the added features, makes the invention suitable for conveniently storing items such as disposable gloves, disposable aprons, or other types of personal protective equipment in a work environment where users may access such items.

The cabinet 20 is a rigid structure fabricated from a light-weight, plastic so as to enable manipulation of the device 10 about the wheels 35, 40 with the use of one (1) hand; however, other light-weight, rigid materials may be utilized. The cabinet 20 has a first side 70, a second side 75, a rear 80, a front 85, a top shelf 25, and a bottom 95, which are conjoined along all vertical and horizontal edges to form the storage cavity 30 within an interior space of the cabinet 20. An opening is disposed on the first side 70 to grant access into the storage cavity 30 by means of opening a first door 160 or a second door 165, or both. It is understood that a similar opening enclosed by similar doors 160, 165 may be disposed on the second side 75 as well without limiting the scope of the device 10. The storage cavity 30 is intended to be used to stack and store various commodity bulk items 15 that are required for a particular work operation. Various embodiments may be provided with at least one (1) interior shelf 90. The top shelf 25 is a planar member with a rail 110 extending upward from a perimeter edge thereof. The rail 110 is formed around the perimeter of the top shelf 25 (as in an alternate embodiment illustrated in FIG. 7); however, in an another embodiment, at least one (1) edge is absent a portion of the rail 110 to enable unfettered access to the top shelf 30 if such access is desired. At least two (2) fixed wheels 35 and two (2) steerable wheels 40 are affixed to the outer surface of the bottom 95 to enable transportation of the cabinet 20 upon a ground surface.

The handle 45 extends from the rear 80 of the cabinet 20 in generally the same geometric plane as that of the rail 110. The handle 45 comprises a first arm 120 and second arm 125, both extending from the rail 110 and connected by a grab bar 130 at a proximal end. The handle 45 is configured to enable a user to grasp the grab bar 130 with at least one (1) hand and push or pull the device 10. In an alternative embodiment, the handle 45 is provided with a tray 50, which is envisioned to have a plurality of recesses 135 each configured to accommodate and retain various commodities 15, such as writing utensils, cylindrical containers, and the like.

In a preferred embodiment, the cabinet 20 is provided with a first door 160 and a second door 165, each attached the first side 70, and/or second side 75, and configured to obstruct the opening when both 160, 165 are in closed positions and grant access to the opening when in open positions. In alternate embodiments, the doors 160, 165 may be attached to the cabinet 20 by means or hinges, or a sliding arrangement. In this embodiment, the first door 160 is provided with a door flange (not shown) protruding from an edge of the first door 160 and configured to rest behind the second door 165 when the doors 160, 165 are in a closed position, provided the first door 160 is closed before the second door 165. The second door 165 is provided with a locking mechanism 110 so that when locked the second door 165 prevents the opening of the first door 160 due to the door flange. It is envisioned for the locking mechanism 65 to comprise a bar-latch (not shown) engaged with a tumbler key lock (not shown), which is operated by insertion of a key into a key guide (not shown); however, other locking mechanisms 65 may be utilized without deviating from the teachings of the device 10. With the use of a bar-latch, a latch-catch is formed into an edge of the first side 70 and is positioned to be engaged by the bar-latch when the second door 165 is closed and the bar-latch is rotated by a key into a locked position. In a locked position, the engagement of the bar-latch with the latch-catch arrests pivotal motioning of the first and second doors 160, 165 about the hinges. In an alternative embodiment, only a single first door 160 hingedly attached to an edge of the first side 70, or second side 75 if the opening is also located on the second side 75, and is configured to obstruct the opening when in a closed position and grant access to the opening when in an open position. It is envisioned for this first door 160 to be provided with the locking mechanism 65 as well to selectively secure the door 50 in a closed position.

In an alternative embodiment of the invention, at least one (1) holder 55 is disposed on an upper surface of the top shelf 25. Each holder 55 is rectangular, extending perpendicularly from the top shelf 25. Accompanying each holder 55 is a container lid 140, where each container lid 140 is preferably a transparent plastic material and has a specifically shaped breach 145 formed into a top surface thereof. Each individual container lid 140 fits within an individual holder 55 and serves to hold commodities 15 placed within the holder 55, but also enables access thereto via the breach 145. This access through the breach 145 facilitates retrieval of commodities 15 with the use of one (1) hand in the case where multi-tasking again pre-occupies the second hand.

In a further embodiment of the invention, at least one (1) receptacle 60 is provided to allow a user to place extra provisions or even use as a refuse container. Each receptacle 60 is preferably a five-sided container that forms a slight taper towards the receptacle bottom 150. A top perimeter edge of at least one (1) side of each receptacle 60 is provided with at least one (1) hook 155. Each hook 155 has a general "J"-shape and is configured to grapple an edge of the rail 110 and allow the receptacle 100 to hang along a side 120, 130, 140 of the cabinet 20. The hooked 290 configuration of each receptacle 100 enables adjustable placement of each receptacle 100 along the rail 110 with the use of one (1) hand if, again, the second hand is pre-occupied.

A plurality of foam bumpers 105 are located at the corners of the cabinet 20 to obviate the marring of any object, or minimize any injury to a passer-by, which may be inadvertently contacted by the device 10. The bumpers may be located at several points along each corner and may be composed of other materials without limiting the scope of the device 10.

The preferred embodiment of the present invention can be utilized in a simple and straightforward manner with little or no training. After initial purchase or acquisition of the device 10, it would be assembled as indicated in FIG. 1. The method of utilizing the device 10 may be achieved by performing the following steps: acquiring a model of the device 10 to suit the needs of a user; unlocking the locking mechanism 65 and swinging open the doors 160, 165; stocking the storage cavity 30 with the selected commodities 15; swinging the doors 160,165 closed and securing them with the locking mechanism 65; removing the container lids 140 and placing containers of commodities 15 within the holders 55; replacing the container lids 140 onto the holders 55; placing various commodities 15 as necessary into the recesses 135 of the tray 50; removably securing as many receptacles 60 as is desired to the rail 110; either using the receptacles 60 as a provisions container or a refuse container; grasping the grab bar 130 of the handle 45 and transporting the device 10 upon the wheels 35, 40 to a work station; and, availing one's self of the convenient accessibility of the device 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A utility cart, comprising:
   a cabinet having a first side, a second side, a front side, a rear side, a bottom, and a top shelf conjoined to form a storage cavity within an interior space of said cabinet;
   an opening disposed on at least one of said first side and said second side configured to grant access to said storage cavity;
   a guide rail disposed on an upper perimeter edge of said top shelf;
   at least two wheel assemblies rotatingly affixed to an outer surface of a common side of said bottom;
   a push handle extending from said front side and substantially in a same geometric plane as said guide rail;
   a door hingedly attached to an edge of at least one of said first side and said second side and configured to obstruct said opening when in a closed position;
   at least one container holder attached to an upper surface of said top shelf; and,
   a container lid for each individual container holder, each configured to fit within said container holder and hold ancillary items placed within said container holder, each container lid having a breach portion.

2. The cart recited in claim 1, wherein said guide rail extends an entire circumference of said top shelf.

3. The cart recited in claim 1, wherein each wheel assembly comprises an axle and hub having wheels rotatingly affixed to distal ends thereof.

4. The cart recited in claim 1, further comprising at least one interior shelf supported within said cavity.

5. The cart recited in claim 1, wherein said push handle comprises a first arm and a second arm extending from said guide rail, wherein a cross bar connects said first and second arms.

6. The cart recited in claim 5, wherein said push handle is provided with a tray having a plurality of recessed molds, each recess mold configured to slidably receive and retain ancillary items.

7. The cart recited in claim 1, further comprising a plurality of bumpers, each located at a corner of said cabinet.

8. The cart recited in claim 1, further comprising at least one receptacle, each having at least one hook configured to hang said receptacle on said guide rail.

9. A utility cart, comprising:
   a cabinet having a first side, a second side, a front side, a rear side, a bottom, and a top shelf conjoined to form a storage cavity within an interior space of said cabinet;
   an opening disposed on at least one of said first side and said second side and configured to grant access to said storage cavity;
   a guide rail disposed on an upper perimeter edge of said top shelf;
   at least two wheel assemblies rotatingly affixed to an outer surface of a common side of said bottom;
   a push handle extending from said front side and substantially in a same geometric plane as said guide rail;
   a first door hingedly attached to an edge of at least one of said first side and said second side, said first door is provided with a door flange;
   a second door hingedly attached to an edge of at least one of said first side and said second side;
   at least one container holder attached to an upper surface of said top shelf; and,
   a container lid for each individual container holder, each configured to fit within said container holder and hold ancillary items placed within said container holder, each container lid having a breach portion;
   wherein said first and second doors are configured to obstruct said opening when in closed positions.

10. The cart recited in claim 9, wherein said guide rail extends an entire circumference of said top shelf.

11. The cart recited in claim 9, wherein each wheel assembly comprises an axle and hub having wheels rotatingly affixed to distal ends thereof.

12. The cart recited in claim 9, further comprising at least one interior shelf supported within said cavity.

13. The cart recited in claim 9, wherein said push handle comprises a first arm and a second arm extending from said guide rail, wherein a cross bar connects said first and second arms.

14. The cart recited in claim 13, wherein said push handle is provided with a tray having a plurality of recessed molds, each recess mold configured to slidably receive and retain ancillary items.

15. The cart recited in claim 9, further comprising a plurality of bumpers, each located at a corner of said cabinet.

16. The cart recited in claim 9, further comprising at least one receptacle, each having at least one hook configured to hang said receptacle on said guide rail.

\* \* \* \* \*